United States Patent
Kim (10) Patent No.: US 10,177,586 B2
(45) Date of Patent: Jan. 8, 2019

(54) ELECTRIC ENERGY STORAGE APPARATUS

(71) Applicant: LSIS CO., LTD., Anyang-si, Gyeonggi-do (KR)

(72) Inventor: Unghoe Kim, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/591,010

(22) Filed: May 9, 2017

(65) Prior Publication Data

US 2017/0331311 A1  Nov. 16, 2017

(30) Foreign Application Priority Data

May 11, 2016 (KR) .......................... 10-2016-0057471

(51) Int. Cl.
*H02J 7/00* (2006.01)
*H02H 3/087* (2006.01)

(52) U.S. Cl.
CPC ........... *H02J 7/0068* (2013.01); *H02H 3/087* (2013.01); *H02J 7/007* (2013.01)

(58) Field of Classification Search
CPC .................................................... H02J 7/0068
See application file for complete search history.

(56) References Cited

U.S. PATENT DOCUMENTS

| 4,465,943 A | 8/1984 | Risberg | |
|---|---|---|---|
| 6,737,762 B2 * | 5/2004 | Koenig | H02J 9/062 307/48 |
| 2009/0027932 A1 * | 1/2009 | Haines | H02J 9/062 363/95 |
| 2010/0219688 A1 * | 9/2010 | Shyu | H02J 7/35 307/66 |
| 2012/0176079 A1 * | 7/2012 | Nakashima | H01L 31/02021 320/101 |

(Continued)

FOREIGN PATENT DOCUMENTS

| JP | H10336916 A | 12/1998 |
|---|---|---|
| JP | 2002233061 | 8/2002 |

(Continued)

OTHER PUBLICATIONS

Japanese Office Action for related Japanese Application No. 2017-094579; action dated Sep. 19, 2017; (3 pages).

(Continued)

*Primary Examiner* — Daniel Kessie
(74) *Attorney, Agent, or Firm* — K & L Gates LLP (57) ABSTRACT

An electric energy storage apparatus according to an embodiment may include a grid configured to supply first electric energy; a generator configured to supply second electric energy; and an electric energy storage apparatus configured to receive and store at least one of the first electric energy and the second electric energy, and supply the stored electric energy or the received electric energy to an electric load, wherein the electric energy storage apparatus senses a magnitude of electric energy discharged to the grid in an operation mode of supplying the stored electric energy to the electric load, and changes the operation mode when the sensed magnitude of electric energy exceeds a preset first threshold value.

8 Claims, 8 Drawing Sheets

(56) References Cited

U.S. PATENT DOCUMENTS

| | | | | |
|---|---|---|---|---|
| 2014/0111006 A1* | 4/2014 | Baldassarre | ............ | H02J 9/002 307/23 |
| 2014/0217983 A1* | 8/2014 | McCalmont | .............. | H02J 1/10 320/128 |
| 2014/0333140 A1* | 11/2014 | Baba | ......................... | H02J 3/12 307/82 |
| 2017/0012428 A1* | 1/2017 | Nakayama | .............. | H02J 3/381 |
| 2017/0093162 A1* | 3/2017 | Inoue | ...................... | H02J 3/382 |
| 2017/0317501 A1* | 11/2017 | Moriyama | ................ | H02J 3/38 |
| 2017/0331372 A1* | 11/2017 | Miki | ......................... | H02J 3/32 |

FOREIGN PATENT DOCUMENTS

| | | |
|---|---|---|
| JP | 2004279321 | 10/2004 |
| JP | 2005020899 | 1/2005 |
| JP | 2007159370 | 6/2007 |
| JP | 2012016156 A | 1/2012 |
| JP | 2012170259 A | 9/2012 |
| JP | 2013074637 | 4/2013 |
| JP | 2013172514 | 9/2013 |
| JP | 2013247841 A | 12/2013 |
| JP | 2014023412 A | 2/2014 |
| JP | 2014072976 | 4/2014 |
| JP | 2014073052 | 4/2014 |
| JP | 2014217177 | 11/2014 |
| JP | 2015162911 A | 9/2015 |

OTHER PUBLICATIONS

Korean Intellectual Property Office Application No. 10-2016-0057471, Office Action dated Jun. 29, 2017, 21 pages.
Korean Intellectual Property Office Search report dated Apr. 20, 2016, 12 pages.
Korean Intellectual Property Office Application No. 10-2016-0057471, Office Action dated Nov. 28, 2016, 5 pages.
Japanese Notice of Allowance for related Japanese Application No. 2017-094579; action dated Feb. 6, 2018; (2 pages).

* cited by examiner

FIG. 8

ELECTRIC ENERGY STORAGE APPARATUS

CROSS-REFERENCE TO RELATED APPLICATIONS

Pursuant to 35 U.S.C. § 119(a), this application claims the benefit of earlier filing date and right of priority to Korean Application No. 10-2016-0057471, filed on May 11, 2016, the contents of which are all hereby incorporated by reference herein in its entirety.

BACKGROUND OF THE INVENTION

1. Field of the Invention

The present disclosure relates to an electric energy storage apparatus, and more particularly, to an electric energy storage apparatus capable of preventing discharged electric energy from being supplied to a grid during the discharge of a battery.

2. Description of the Related Art

Electric energy is widely used because of its ease of conversion and transmission. In order to efficiently use electric energy, a Battery Energy Storage System (BESS) is used. The battery energy storage system receives electric energy from a commercial grid or a generator such as a photovoltaic generator, wind power generator to charge a battery. In addition, when a local load requires electric energy, the battery energy storage system discharges the charged electric energy from the battery to supply electric energy to the electric load.

Specifically, in case of a battery energy storage system including a battery and a generator, it operates as follows. The battery energy storage system discharges stored electric energy when the electric load is a heavy load. Furthermore, when the electric load is a light load, the battery energy storage system receives electric energy from the generator or grid to charge it.

In addition, when the battery energy storage system exists independently irrelevant to the generator, the battery energy storage system receives idle electric power from an external power supply source to charge it. Moreover, when the electric load is a heavy load, the battery energy storage system discharges electric energy charged in the battery to supply electric power.

When electric power supply is abruptly cut off, a failure may occur in industrial fields or household electrical appliances. Therefore, the stability of the power supply system is considered to be very important. Furthermore, in general, the power supply system is often located at a remote location away from general residences and workplaces. Therefore, there is a need for a redundant system for allowing a backup power supply system to operate even when an abnormality occurs in a part of the power supply system.

On the other hand, the battery energy storage system described above is a system for storing electric energy supplied from a generator or a grid in a battery, and discharging the stored electric energy and supplying the discharged electric energy to an electric load when required.

A stand-alone battery storage apparatus supplies electric energy only to a local load at the time of discharging, and power supply due to the discharge should be prevented in the grid.

Figure 1:
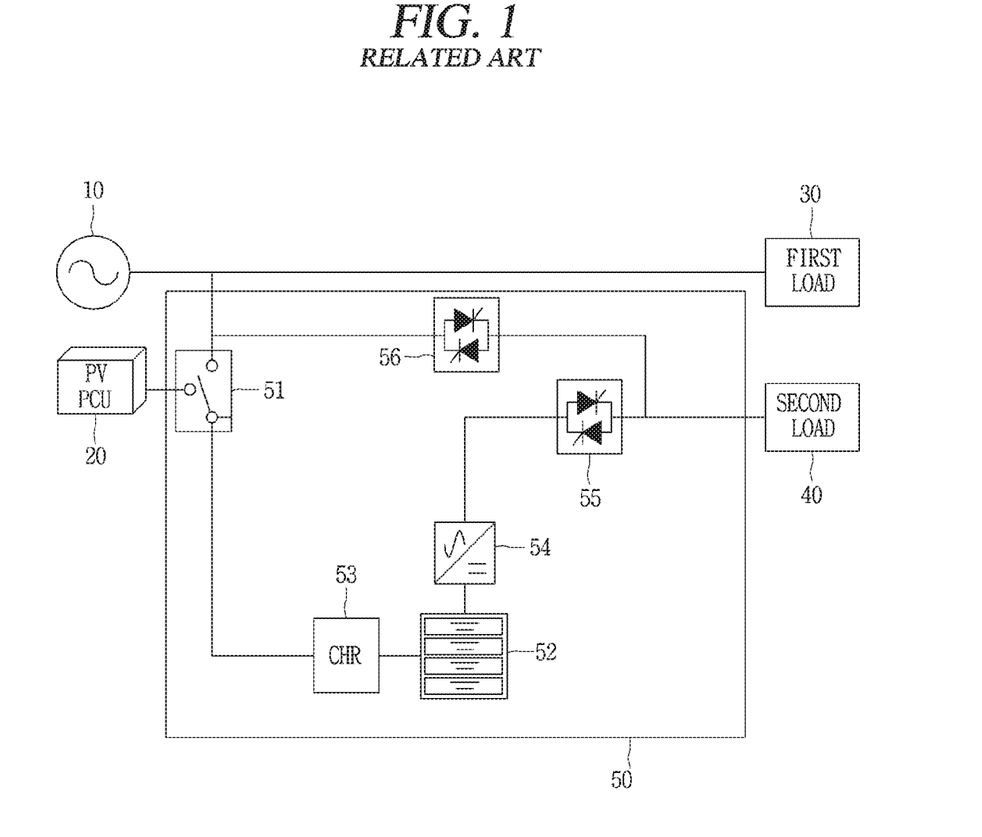
FIG. 1 is a block diagram illustrating the configuration of a conventional electric energy storage apparatus.

FIG. 1 is a block diagram illustrating an entire electric energy system configuration including a configuration of an electric energy storage apparatus.

Referring to FIG. 1, the overall electric energy system including an electric energy storage apparatus 50 according to the related art includes a grid 10, a generator 20, a first load 30, a second load 40, and the electric energy storage apparatus 50.

The grid 10 as a system for supplying commercial AC electric power includes many power plants, substations, electrical transmission and distribution lines, and electrical loads, and the grid 10 is a system for generating, transmitting, and using commercial AC electric power.

The first load 30 and the second load 40 receive electric energy from the grid 10 or generator 20 to consume electric power (energy).

The first load 30 is a normal electrical load.

The second load 40 is a critical load, and may be an electric load set by a user.

In other words, an electric load in the present disclosure may be broadly divided into two types of loads. The first load 30 as a general load receive energy only from the grid 10 to consume electric power. Here, the first load 30 is an electric load capable of stopping power supply according to various grid conditions. For example, the first load 30 may not be supplied with energy in an emergency condition such as a power failure. The electric load capable of allowing to stop power supply according to the foregoing grid conditions among a plurality of loads may be set as the first load 30.

In addition, the second load 40 may be an important load in which power supply should be maintained even in various grid conditions as described above, and the energy supply source is changed according to the grid conditions. The second load 40 may be set by the user for the electric load that should always operate normally among a plurality of loads.

The electric energy storage apparatus 50 includes a first switch 51, a battery 52, a charger 53, an inverter 54, a second switch 55 and a third switch 56.

An end of the first switch 51 is connected to the grid 10 and the generator, and the other end thereof is connected to the charger 53. An end of the second switch 55 is connected to the inverter 54, and the other end thereof is connected to the second load 40. An end of the third switch 56 is connected to the grid 10 and the other end thereof is connected to the second load 40.

The charger 53 receives electric energy from the grid 10 or generator 20 connected through the first switch 51 to supply charging power for charging the battery 52. The charger 53 may include a rectifier circuit for converting an alternating current into a direct current.

The battery 52 receives and stores the converted electric energy through the charger 53 or discharges the stored electric energy.

The inverter 54 converts DC electric energy output by the discharge of the battery 52 into AC electric energy and supplies the AC electric energy to the second load 40.

The electric energy storage apparatus as described above charges the battery 52 according to circumstances, and supplies the charged electric energy or the electric energy supplied from the grid 10 to the second load 40.

Meanwhile, when electric energy is supplied to the second load 40 by the discharge of the battery 52, the third switch 56 is turned off and the second switch 55 is turned on. In other words, when the battery 52 is discharged, a power supply line between the second load 40 and the grid 10 should be broken, and on the contrary, a current flow through a power supply line between the battery 52 and the second load 40 should be allowed. In addition, when the battery 52 is discharged, the third switch 56 is turned off, and accordingly, electric energy discharged through the battery 52 is not discharged to the grid 10.

However, in such a general electric energy storage apparatus, when a failure such as an electric shortage of the third switch 56 occurs, electric energy outputted from the inverter 54 may be discharged to the grid 10 through the third switch 56, and thus there is a problem in which an energy flow in the grid 10 may be unstable due to a reverse power flow (a phenomenon of discharging electric energy to the grid) and the reliability of the electric energy storage apparatus is significantly reduced.

SUMMARY OF THE INVENTION

An object of the present disclosure is to provide an electric energy storage apparatus capable of accurately and rapidly detecting a reverse power flow phenomenon in which electric power due to discharge flows out to a grid at the time of discharging a battery included in the electric energy storage apparatus.

Another object of the present disclosure is to provide an electric energy storage apparatus capable of preventing the reliability from being reduced by stopping the operation of an inverter to interrupt the supply of a reverse power flow when the reverse power flow phenomenon occurs in the electric energy storage apparatus.

Still another object of the present disclosure is to provide an electric energy storage apparatus in which a plurality of switches connected to a grid are provided to supply normal electric power to an electric load as well as break power supplied to the grid by controlling an auxiliary switch when a reverse power flow phenomenon occurs.

The objects of the present disclosure can be accomplished by provided an electric energy storage apparatus configured to receive and store at least one of first electric energy supplied from a grid or second electric energy supplied from a generator, and supply the stored electric energy or electric energy supplied from at least one of the grid and the generator to an electric load,
wherein the electric energy storage apparatus is configured to sense a magnitude of electric energy discharged to the grid in an operation mode of supplying the stored electric energy to the electric load, and selectively block the output of the stored electric energy when the sensed magnitude of electric energy exceeds a preset first threshold value.

According to a preferred aspect of the present disclosure, the electric energy storage apparatus may include a battery configured to store electric energy supplied from any one of the grid and the generator, and selectively output the stored electric energy; a first switch disposed between a connection node connecting the grid to the generator and the battery; a second switch disposed between the battery and an electric load; a third switch disposed between the grid and the electric load; a first sensing unit disposed between the grid and the third switch to sense an electric energy state at the disposed position; and a controller configured to sense whether or not electric energy is discharged to the grid through the first sensing unit in a state that the third switch is off, and selectively stop a discharge operation of the battery according to the sensing result.

According to another preferred aspect of the present disclosure, an operation mode of the electric energy storage apparatus may include at least one of a first operation mode for charging the battery using the first electric energy, a second operation mode for charging the battery using the second electric energy, a third operation mode for supplying the first electric energy to the electric load and charging the second electric energy to the battery, a fourth operation mode for supplying the first electric energy to the electric load, and a fifth operation mode for supplying electric energy stored in the battery to the electric load.

According to still another preferred aspect of the present disclosure, the controller may be configured to sense the presence of electric energy discharged to the grid based on a magnitude of electric energy sensed through the first sensing unit in the fifth operation mode.

According to yet still another preferred aspect of the present disclosure, the electric energy storage apparatus may further include a second sensing unit disposed between the second switch and the electric load to sense an electric energy state at the disposed position, and the controller may be configured to sense the presence of electric energy discharged to the grid based on a state of electric energy sensed through the second sensing unit.

According to still yet another preferred aspect of the present disclosure, when a magnitude of electric energy sensed through the second sensing unit decreases to less than a preset second threshold value, the controller may determine that the electric energy is discharged to the grid to stop the supply of electric energy to the electric load.

According to yet still another preferred aspect of the present disclosure, the third switch may include a main switch and an auxiliary switch disposed between the grid and the electric load and connected in series to each other, and the first sensing unit is disposed between the main switch and the auxiliary switch.

According to still yet another preferred aspect of the present disclosure, the controller may change a switching state of the auxiliary switch when a magnitude of electric energy sensed through the first sensing unit exceeds the first threshold value.

According to still yet preferred aspect of the present disclosure, the auxiliary switch may be configured to maintain an on-state in the first to fifth operation modes, and to be changed to an off-state as the magnitude of the electric energy exceeds the first threshold value.

According to a preferred aspect of the present disclosure, an electric energy storage apparatus according to the present disclosure may further include a third sensing unit disposed between the grid and the auxiliary switch, wherein the controller is configured to stop the supply of electric energy to the electric load when a magnitude of electric energy sensed through the third sensing unit exceeds the first threshold value.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, preferred embodiments of the present invention will be described in detail with reference to the accompanying drawings to such an extent that the present invention can be easily embodied by a person having ordinary skill in the art to which the present invention pertains. However, the present invention may be implemented in various different forms, and therefore, the present invention is not limited to the illustrated embodiments. In order to clearly describe the present invention, parts not related to the description are omitted, and like reference numerals designate like constituent elements throughout the specification.

Furthermore, when a portion may "include" a certain constituent element, unless specified otherwise, it may not be construed to exclude another constituent element but may be construed to further include other constituent elements.

Accordingly, according to the present disclosure, in an electric energy storage apparatus, when electric energy is supplied to an electric load by the discharge of a battery, it may be possible to accurately detect whether there is a reverse power flow phenomenon in which electric energy is discharged to the grid to cut off electric energy discharged to the grid.

Figure 2:
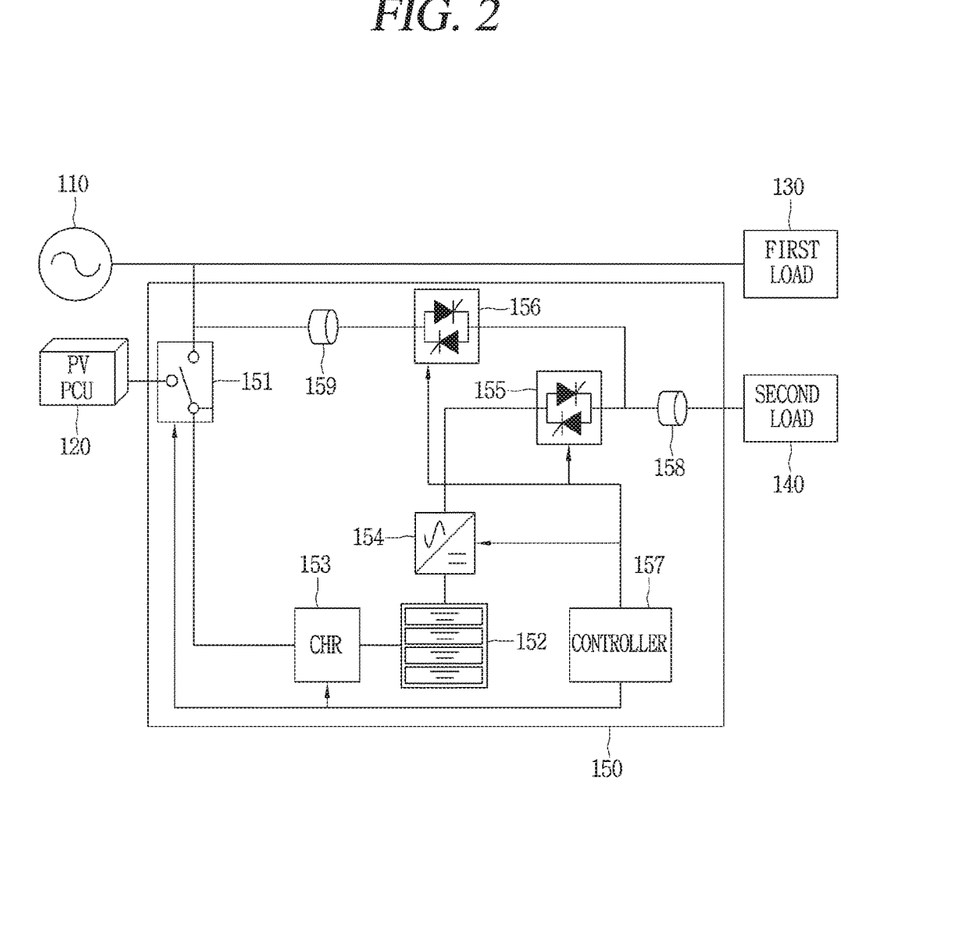
FIG. 2 is a block diagram illustrating the configuration of an electric energy storage apparatus according to a first embodiment of the present disclosure.

FIG. 2 is a view illustrating the configuration of an electric energy storage apparatus according to a first embodiment of the present disclosure, and FIGS. 3 through 7 are views illustrating an electric energy flow according to an operation state in an electric energy storage apparatus illustrated in FIG. 2.

Referring to FIG. 2, an overall electric energy system including an electric energy storage apparatus 150 according to the present disclosure includes a grid 110, a generator 120, a first load 130, a second load 140, and an electric energy storage apparatus 150.

Furthermore, the electric energy storage apparatus 150 according to a preferred embodiment of the present disclosure includes a first switch 151, a battery 152, a charger 153, an inverter 54, a second switch 155, a third switch 156, a controller 157, a first sensing unit 158, and a second sensing unit 159.

The grid 110 as a system for supplying commercial AC power includes a power plant, a substation, a transmission and distribution line, and an electric load, and is a system for generating, transmitting, and using electric power.

The first load 130 is an ordinary load, and receives electric energy supplied from the grid 110, and consumes the received electric energy.

The second load 140 receives energy supplied from the grid 110 or energy supplied by the discharge of the battery 152, and consumes the received energy. The second load 140 is a critical load, and may be an electric load selectively designated by the user.

The generator 120 generates electric energy by a power generation operation, and supplies the generated electric energy. The generator 120 may include a solar power generator, a wind power generator, and a hydro generator.

On the drawing, it is shown that the generator 120 is configured with a solar power generator, but it is merely an embodiment, and the generator 120 may also include a generator other than the solar power generator.

Here, when the generator 120 is a solar power generator, the generator 120 includes a solar cell array and a Power Conversion Unit (PCU) for converting DC power supplied from the solar cell array into AC power and outputting the AC power. Accordingly, the generator 120 may supply AC power using electric energy stored by the solar cell array. Here, the solar cell array is a combination of a plurality of solar cell modules, and the solar cell module is a device including a plurality of solar cells connected to each other in series or parallel for converting light energy into electric energy to generate a predetermined voltage and current. Thus, a solar cell array converts light energy into electric energy.

Furthermore, when the generator 120 is a wind power generator, the generator 120 may include a fan for converting wind energy into electric energy.

The electric energy storage apparatus 150 stores electric energy supplied through the grid 110 and the generator 120 or supplies energy supplied from the grid 110 or the stored electric energy into the second load 140.

To this end, the electric energy storage apparatus 150 includes a first switch 151, a battery 152, a charger 153, an inverter 154, a second switch 155, a third switch 156, a controller 157, a first sensing unit 158, and a second sensing unit 159.

An input terminal of the first switch 151 is selectively connected to either one of the grid 110 and the generator 120, and an output terminal thereof is connected to the charger 153.

The first switch 151 is selectively switched to select an object for supplying charging power to the battery 152.

When the first switch 151 is connected to the grid 110, electric energy supplied from the grid 110 is transferred to the charger 153. Furthermore, when the first switch 151 is connected to the generator 120, electric energy supplied from the generator 120 is transferred to the charger 153. In addition, when the first switch 151 is not connected to both the grid 110 and the generator 120, no electric energy is supplied to the charger 153.

An end (input terminal) of the charger 153 is connected to the output terminal of the first switch 151, and the other end (output terminal) is connected to the battery 152.

The charger 153 receives electric energy supplied through the first switch 151, and performs AC-DC conversion on the received electric energy, and supplies the converted DC energy to the battery 152.

To this end, the charger 153 may include an AC-to-DC converter (not shown), such as a rectifier circuit unit configured to convert the received AC electric energy into DC electric energy that can be stored in the battery 152.

Furthermore, in addition to the AC-DC converter, the charger 153 may further include a DC-DC converter for adjusting a magnitude of the supplied voltage.

Only one of the AC-DC converter and the DC-DC converter of the charger 153 may selectively operate or both of the converters may operate under the control of the controller 157.

The battery 152 stores DC power converted through the charger 153. The battery 152 may include a battery pack including a plurality of battery cells. Here, the plurality of battery cells included in the battery pack are required to uniformly maintain a voltage of each battery cell for stability, improved lifetime, and high power. Accordingly, the embodiment may further include a battery control device (not shown). The battery control device controls each battery cell to have a suitable uniform voltage while charging or discharging battery cells in the battery pack.

On the contrary, it is difficult for a plurality of battery cells to stably maintain an equilibrium state due to various factors such as a change of internal impedance and the like. Thus, an additionally provided Battery Management System (BMS) has a balancing function for equalizing the charging states of the plurality of battery cells. For example, due to a difference in discharge rates of battery cells in the battery pack, a difference in SOC (State Of Charge) between battery cells in the battery pack may occur over time. In order to overcome capacity imbalance between the battery cells, each of the battery cells may further include an additional circuit for charging and/or discharging.

In order for battery cells within the foregoing battery pack to maintain a predetermined voltage, the battery 152 may be managed by the BMS, and the BMS may be included in the controller 157. Furthermore, the battery 152 may discharge electric energy at a predetermined voltage under the control of the controller 157.

For example, the controller 157 may detect a voltage of the battery cells, and supply DC power to the battery 152 for charging when the battery voltage decreases below a preset lower limit value, and control DC power to be output from the battery 152 for discharging when the battery voltage increases above a preset upper limit value.

The inverter 154 operates under the control of the controller 157, and converts DC electric energy output through the battery 152 into AC electric energy required by the second load 140.

The second switch 155 is disposed between the inverter 154 and the second load 140 to open or close a supply path of electric energy output through the inverter 154.

The second switch 155 may be configured with a bidirectional switches.

An end of the second switch 155 is connected to an output end of the inverter 154 and the other end thereof is connected to an input end of the second load 140.

In addition, when the inverter 154 is operated to supply electric power from the battery 152, the second switch 155 operates in an on state under the control of the controller 157 (in particular, a switch allowing a current flow to a side of the second load of the bidirectional switches operates in an on state), and as a result, electric energy converted through the inverter 154 is supplied to the second load 140.

Furthermore, when the operation of the inverter 154 is stopped to charge the battery 152, the second switch 155 operates in an off state under the control of the controller 157, and as a result, power supply from the inverter 154 to the second load 140 may be broken.

The third switch 156 is disposed (connected) between the grid 110 and the second load 140 to open or close a supply path of electric energy supplied from the grid 110 to the second load 140.

Accordingly, one end of the third switch 156 is connected to a side of the grid 110 and the other end of the third switch 156 is connected to an input terminal of the second load 140.

The third switch 156 can be configured with a bidirectional switches.

Furthermore, the third switch 156 operates in an on state under the control of the controller 157 when electric energy supplied through the grid 110 is supplied to the second load 140 (in particular, a switch allowing a current flow to a side of the second load of the bidirectional switches operates in an on state), and as a result, electric energy supplied from the grid 110 is supplied to the second load 140 through the third switch 156.

In addition, when the electric energy transferred from the grid 110 should not be supplied to the second load 140, the third switch 156 operates in an off state under the control of the controller 157, and as a result, a power supply path between the grid 110 and the second load 140 is disconnected.

The first sensing unit 158 is disposed (connected) between the second switch 155 and the second load 140 to sense the state of electric energy supplied to the second load 140 through the second switch 155.

Here, the first sensing unit 158 can be configured with either one of a voltage sensor and a current sensor, and as a result, the first sensing unit 158 may sense a voltage or current of the electric energy supplied to the second load 140.

Furthermore, the first sensing unit 158 transfers information on the sensed state of the electric energy to the controller 157.

The second sensing unit 159 is disposed (connected) between the grid 110 and the third switch 156 to sense the state of electric energy flowing through a power line between the grid 110 and the third switch 156.

The second sensing unit 159 can sense the state of electric energy supplied from the grid 110 to the second load 140 when the third switch 156 is in an on state.

Furthermore, in a state in which the third switch 156 is in an off state (more specifically, a switch having a current flowing direction to a side of the second load of the bidirectional switches is off and the other switch having a current flowing direction to a side of the grid is on), the second sensing unit 159 senses the state of electric energy flows out to the grid 110 through the third switch 156.

Similar to the first sensing unit 158, the second sensing unit 159 can be configured with either one of a voltage sensor and a current sensor.

The controller 157 controls an overall operation of the electric energy storage apparatus.

In particular, the controller 157 controls a switching state (i.e., switching) of the first switch 151, the second switch 155, and the third switch 156.

Furthermore, the controller 157 controls a power conversion operation of the charger 153 and the inverter 154.

In other words, the controller 157 controls a switching state of the first switch 151, the second switch 155 and the third switch 156, and a power conversion operation of the charger 153 and the inverter 154 according to an operation mode of the electric energy storage apparatus.

The operation mode of the electric energy storage apparatus may include first to fifth operation modes.

Hereinafter, the first to fifth operation modes will be described with reference to FIGS. 3 through 7.

Figure 3:
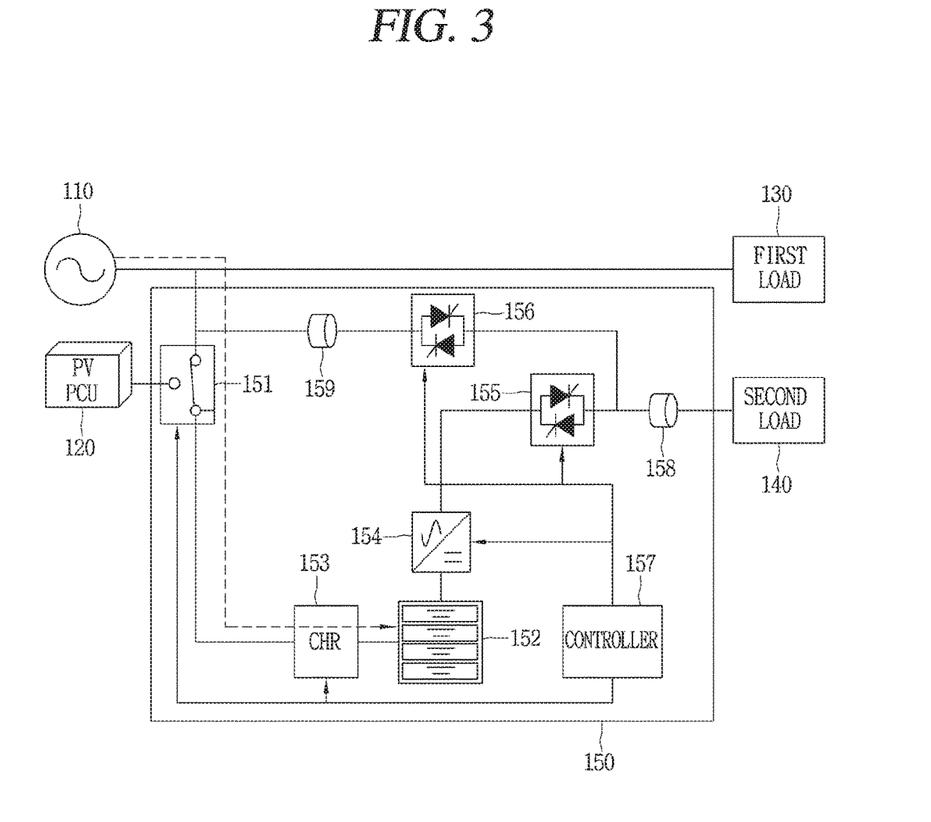
FIGS. 3 through 7 are block diagrams illustrating an electric energy flow according to an operation state in an electric energy storage apparatus illustrated in FIG. 2.

Referring to FIG. 3, the first operation mode is a first charging mode for charging the battery 152.

More specifically, the first operation mode is a first charging mode in which the battery 152 is charged using electric energy supplied from the grid 110.

To this end, the controller 157 controls the first switch 151 to connect the grid 110 to the charger 153. Accordingly, the charger 153 receives AC electric energy from the grid 110 connected through the first switch 151, and converts the received AC electric energy into DC electric energy for charging the battery 152.

At this time, the controller 157 controls the second switch 155 and the third switch 156 to operate in an off state. Accordingly, the supply of electric energy to a next stage side, namely, a side of the second load 140, is broken through the second switch 155 and the third switch 156.

The first charging mode has an electric energy flow as indicated by a dotted arrow in which charging power is supplied to the battery 152 through the grid 110, the first switch 151, and the charger 153.

The first operation mode may be carried out in case where no electricity is generated from the generator 120, and no electric energy is required in the second load 140, and there exists electric energy supplied from the grid 110, and the charge of the battery 152 is required.

Figure 4:
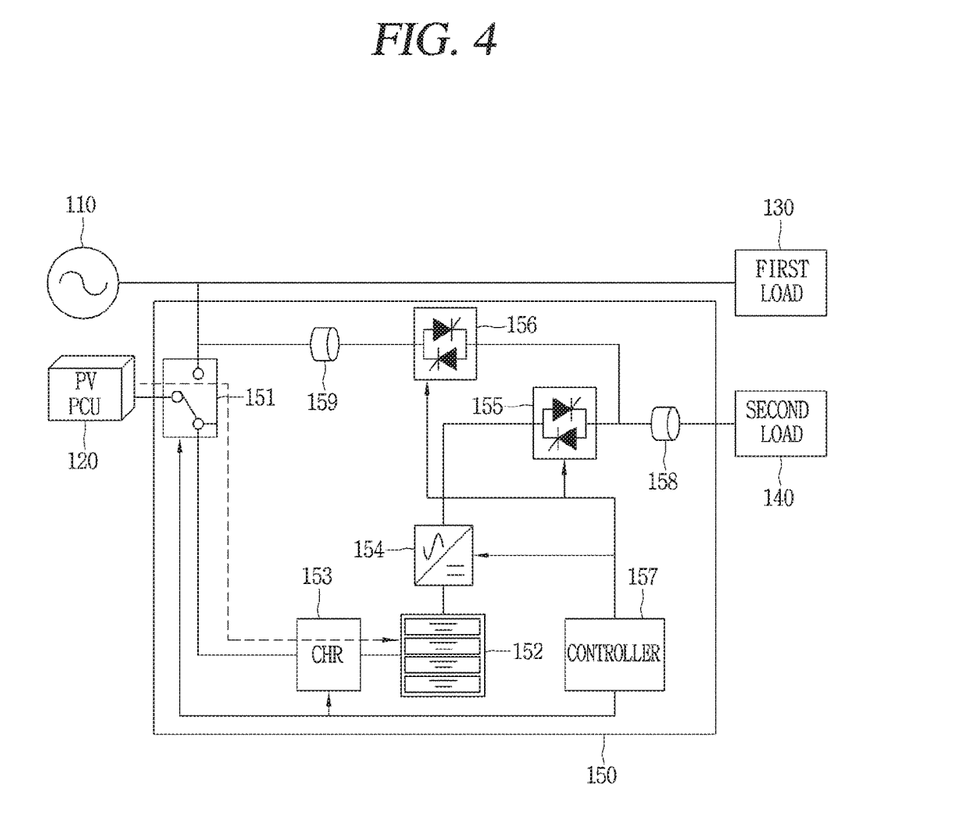

Referring to FIG. 4, the second operation mode is a second charging mode for charging the battery 152.

More specifically, the second operation mode is a second charging mode in which the battery 152 is charged using electric energy supplied from the generator 120.

To this end, the controller 157 controls the first switch 151 to connect the charger 153 to the generator 120. Accordingly, the charger 153 receives electric energy from the generator 120 connected through an end of the first switch 151, and performs a power conversion operation for charging the battery 152 using the received electric energy.

At this time, when the generator 120 is a photovoltaic generator, since electric energy is DC energy, the DC-DC converter described above in the charger 153 is selectively operated under the control of the controller 157 to increase or decrease a voltage of the received DC electric energy to supply it to the battery 152.

Here, the controller 157 controls the second switch 155 and the third switch 156 to be in an off state, and accordingly, not to supply electric energy to a next stage side subsequent to the second switch 155 and the third switch 156, namely, a side of the second load 140.

The second charging mode has an electric energy flow as indicated by a dotted line arrow in FIG. 4, in which charging power is supplied to the battery 152 through the generator 120, the first switch 151 and the charger 153.

Meanwhile, the second operation mode may be carried out in case where electricity is generated from the generator 120, an electric rate supplied through the grid 110 is high cost, and electric energy is not required in the second load 140, and the charge of the battery 152 is required.

Figure 5:
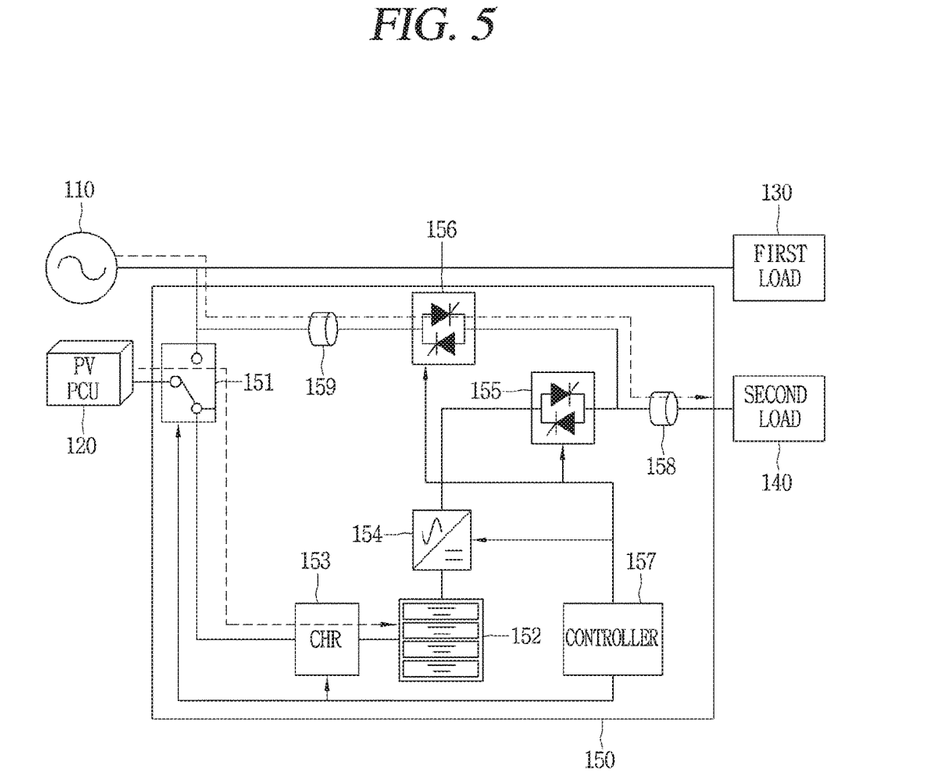

Referring to FIG. 5, the third mode of operation is a charging and supplying mode for charging the battery 152 while at the same time supplying electric energy to the second load 140.

More specifically, the third operation mode is a mode in which the battery 152 is charged using electric energy supplied through the generator 120 while electric energy is supplied to the second load 140 using electric energy supplied through the grid 110.

To this end, the controller 157 controls the first switch 151 to connect the charger 153 to the generator 120.

Accordingly, the charger 153 receives electric energy from the generator 120 connected through the first switch 151, and performs a power conversion operation for charging the battery 152 using the received electric energy.

At this time, when the generator 120 is a photovoltaic generator, since electric energy is DC energy, the DC-DC converter described above in the charger 153 is selectively operated under the control of the controller 157 to increase or decrease a voltage of the received DC electric energy to supply it to the battery 152.

Here, the controller 157 operates the second switch 155 in an off state, and operates the third switch 156 in an on state (more specifically, in particular, a switch having a current flowing direction to a side of the second load in the bidirectional switches, namely, an upper switch in FIG. 5, is in an on state).

Accordingly, as the second switch 155 operates in an off state, a current flow through a power line between the inverter 154 and the second load 140 is disconnected.

Furthermore, as the third switch 156 operates in an on state, a power line between the grid 110 and the second load 140 is connected to each other.

The third operation mode has an electric energy flow in which charging power is supplied to the battery 152 through the generator 120, the first switch 151 and the charger 153, namely, an electric energy flow illustrated as a dotted arrow at a lower portion in FIG. 5. In addition, the third operation mode has an electric energy flow in which electric energy is supplied to the second load 140 through the grid 110 and the third switch 156, namely, an electric energy flow illustrated as a dotted arrow at an upper portion in FIG. 5.

Meanwhile, the third operation mode may be carried out in a situation where the charge of the battery 152 is required and the supply of electric energy to the second load 140 is required.

Figure 6:
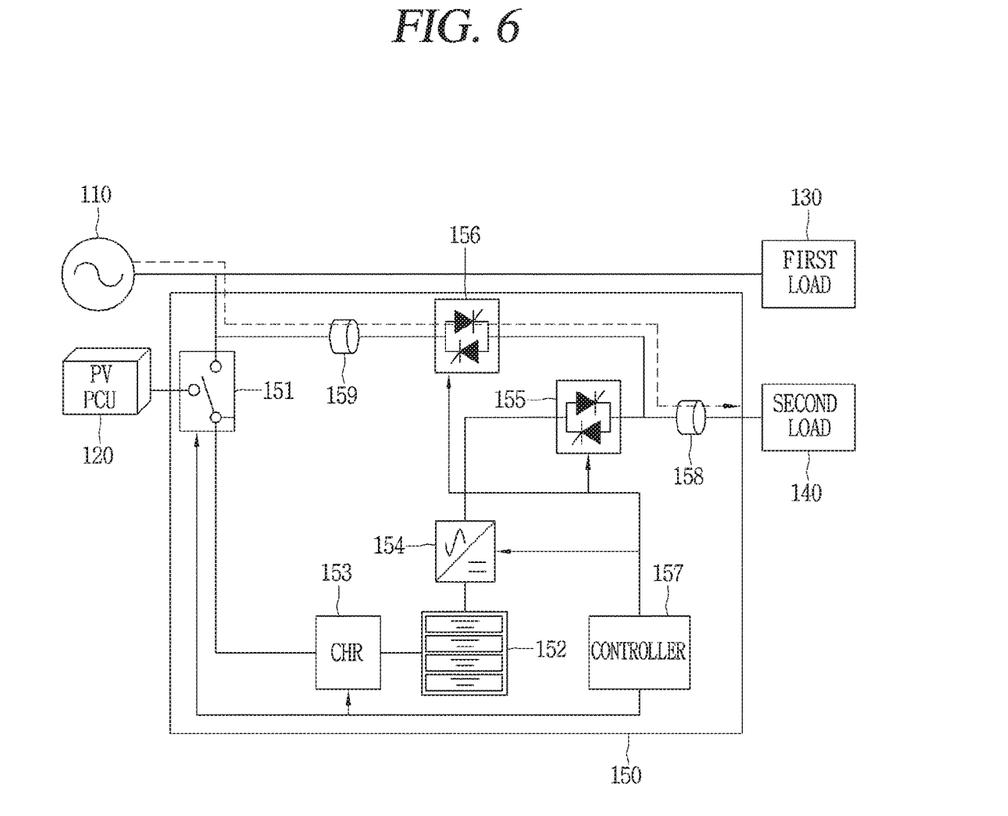

Referring to FIG. 6, the fourth operation mode is a supply mode for supplying electric energy to the second load 140.

More specifically, the fourth operation mode is a mode for supplying electric energy to the second load 140 using electric energy supplied from the grid 110.

To this end, the controller 157 controls the first switch 151 to isolate the charger 153 from both the generator 120 and the grid 110 not to be connected thereto.

In addition, the controller 157 controls the second switch 155 to operate in an off state, and controls the third switch 156 to operate in an on state (specifically, in particular, a switch having a current flowing direction to a side of the second load of the bidirectional switches, namely, an upper switch in FIG. 6, is in an on state).

Accordingly, as the second switch 155 operates in an off state, a power line between the inverter 154 and the second load 140 is disconnected.

Furthermore, as the third switch 156 operates in an on state, a power line between the grid 110 and the second load 140 is connected to each other.

The fourth operation mode has an electric energy flow in which electric energy is supplied from the grid 110 to the second load 140 through the third switch 156, namely, an electric energy flow illustrated as a dotted arrow in FIG. 5.

Meanwhile, the fourth operation mode may be carried out in a situation where the charge of the battery 152 is not required while the supply of electric energy to the second load 140 is required.

Figure 7:
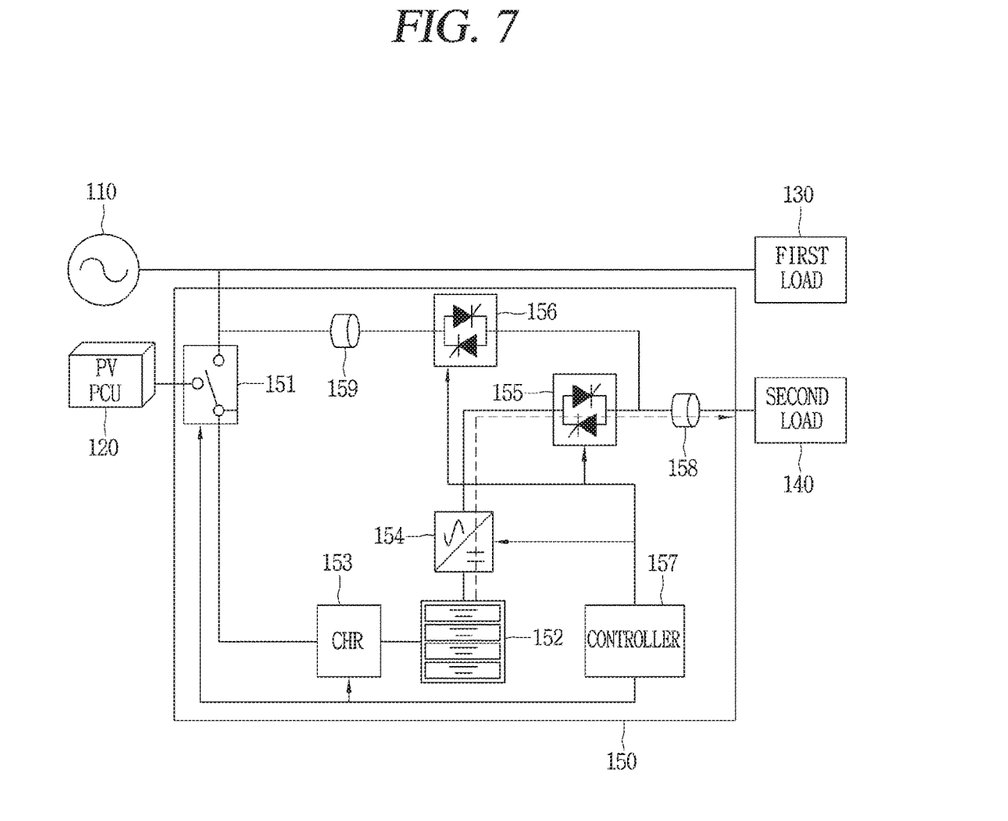

Referring to FIG. 7, the fifth operation mode is a supply mode for supplying electric energy from the battery 152 to the second load 140.

More specifically, the fifth operation mode is a mode in which electric energy is supplied to the second load 140 using electric energy stored in the battery 152 by a discharge operation of the battery 152.

To this end, the controller 157 controls the first switch 151 to disconnect the charger 153 from the generator 120 and the grid 110. In other words, the controller 157 controls the first switch 151 not to allow an input terminal of the first switch 151 to be connected to both the generator 120 and the grid 110.

Furthermore, the controller 157 operates the third switch 156 in an off state, and operates the second switch 155 in an on state (in particular, a switch having a current flowing direction to a side of the second load of the bidirectional switches, namely, an upper switch in FIG. 7, is in an on state).

Accordingly, as the third switch 156 operates in an off state, a power line between the grid 110 and the second load 140 is disconnected.

In addition, as the second switch 155 operates in an on state, a power lines between the inverter 154 and the second load 140 is connected to each other.

The fifth operation mode has an electric energy flow in which electric energy is supplied from the battery 152 to the second load 140 through the inverter 154 and the second switch 155.

Meanwhile, the fifth operation mode may be carried out in a situation where the charge of the battery 152 is not required while the supply of electric energy to the second load 140 is required, and normal electric energy is not supplied from the grid 110 (as power failure occurs).

Meanwhile, the controller 157 receives sensing information transferred through the first sensing unit 158 and the second sensing unit 159. Then, the controller 157 checks a state of the third switch 156 using the received sensing information.

In other words, in a situation where the battery 152 is discharged and the inverter 154 operates, the third switch 156 operates in an off state. At this time, due to a failure such as an electric shortage on the third switch 156, for instance, at least part of electric energy outputted through the inverter 154 may be discharged to the grid 110 through the third switch 156 (in particular, a switch having a current flowing direction to a side of the grid of the bidirectional switches).

As described above, when a reverse power flow phenomenon occurs in which electric energy is discharged to the grid 110, a change occurs in a state of electric energy sensed through the first sensing unit 158 and the second sensing unit 159, namely, a magnitude of electric energy.

For example, in a situation where the foregoing inverter 154 operates, the third switch 156 operates in an off state. At this time, as the third switch 156 operates in an off state, a power line between the grid 110 and the third switch 156 is disconnected.

At this time, when a failure such as a short circuit occurs on the third switch 156, the power line may be connected even when the power line should be disconnected, thereby causing a reverse power flow phenomenon in which electric energy is discharged to the grid.

Accordingly, the controller 157 receives sensing information transferred through the second sensing unit 159, and determines whether the reverse power flow phenomenon occurs using the received sensing information. In other words, when a current or voltage exceeding a predetermined threshold value is sensed through the second sensing unit 159, the controller 157 determines that a failure of the third switch 156 has occurred, and accordingly, operates not to discharge electric energy to the grid 110.

In other words, when the controller 157 senses a current or voltage exceeding a predetermined threshold value through the second sensing unit 159, the controller 157 stops the operation of the inverter 154, thereby stopping a discharge operation of the battery 152.

Accordingly, when a failure occurs on the third switch 156, the controller 157 stops a power conversion operation of the inverter 154 to stop a discharge operation of the battery 152, thereby stopping electric energy from being discharged to the grid 110 through the third switch 156.

Meanwhile, the controller 157 may sense a state of the third switch 156 and a presence of the reverse power flow using sensing information transferred through the first sensing unit 158.

In other words, the inverter 154 outputs a predetermined magnitude of electric energy under the control of the controller 157. At this time, when electric energy is discharged to the grid 110 due to a failure of the third switch 156, electric energy supplied to the second load 140 is reduced.

Accordingly, the controller 157 receives sensing information transferred through the first sensing unit 158, and determines whether or not a magnitude of the electric energy supplied to the second load 140 decreases below a preset reference value.

Furthermore, when the magnitude of the electric energy supplied to the second load 140 decreases below a reference value, the controller 157 determines that a failure of the third switch 156 has occurred, and accordingly, operates not to discharge electric energy to the grid 110.

In other words, in the fifth operation mode as illustrated in FIG. 7, when a magnitude of electric energy sensed through the third sensing unit 159 is lower than a reference value, the controller 157 stops the operation of the inverter 154 to stop a discharge operation of the battery 152. In other words, the electric energy storage apparatus 150 further includes a sixth operation mode, and the sixth operation mode is a mode of stopping the operation of the inverter 154 to stop the discharging operation of the battery 152 to break discharged electric energy as electric energy flows out to the grid 210 as described above.

As described above, the controller 157 receives sensing information through at least one of the first sensing unit 158 and the second sensing unit 159, and senses whether or not there is a reverse power flow in which electric energy flows out to the grid 110 using the received sensing information, and the stops a power conversion operation of the inverter 154 to stop the discharge of the battery 152 when the reverse power flow is sensed.

According to an embodiment of the present disclosure, during the discharge of the battery, it may be possible to accurately and quickly sense a reverse power flow phenomenon in which electric power due to the discharge flows out to the grid, and stop the operation of the inverter as the reverse power flow phenomenon occurs, thereby solving a problem of causing the instability of an energy flow in a grid caused by the reverse power flow and enhancing the reliability of the electric energy storage apparatus.

On the other hand, according to the foregoing first embodiment, it may be possible to sense whether or not electric energy flows out to the grid 110 due to a failure of the third switch 156, thereby effectively breaking electric energy discharged to the grid 110 according to the sensing result.

However, according to the first embodiment, electric energy discharged to the grid 110 can be broken, but electric energy discharged to the second load 140 is also broken.

Accordingly, according to a second embodiment, a method of supplying normal electric energy to the second load 140 while cutting off electric energy discharged to the grid 110 when the reverse power flow occurs is presented.

Figure 8:
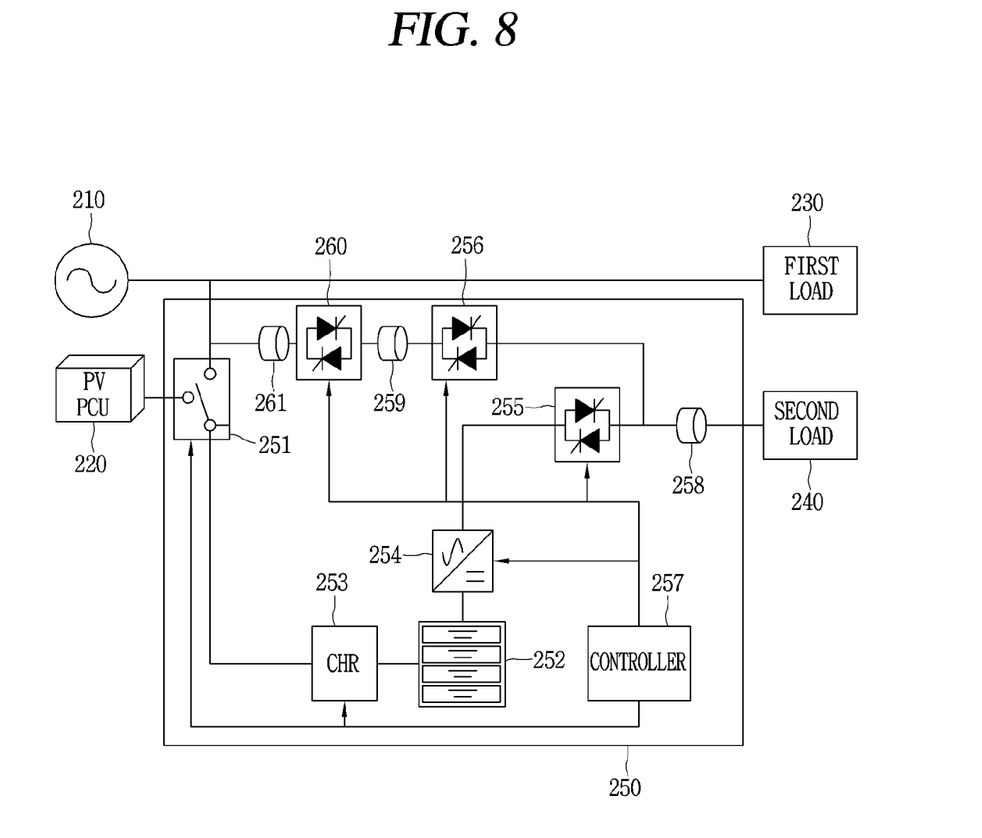
FIG. 8 is a block diagram illustrating the configuration of an electric energy storage apparatus according to a second embodiment of the present disclosure.

FIG. 8 is a view illustrating the configuration of an electric energy storage apparatus according to a second embodiment of the present disclosure.

Referring to FIG. 8, an overall system including an electric energy storage apparatus of the present disclosure includes a grid 210, a generator 220, a first load 230, a second load 240, and the electric energy storage apparatus 250.

Furthermore, the electric energy storage apparatus 250 according to the second embodiment of the present disclosure includes a first switch 251, a battery 252, a charger 253, an inverter 254, a second switch 255, a third switch 256, a controller 257, a first sensing unit 258, and a second sensing unit 259. In addition, the electric energy storage apparatus 250 may further include a fourth switch 260 and a third sensing unit 261 in addition to the foregoing configuration.

Here, in the electric energy storage apparatus 250 according to a second embodiment of the present disclosure, the first switch 251, the battery 252, the charger 253, the inverter 254, the second switch 255, the third switch 256, the controller 257, the first sensing unit 258 and the second sensing unit 259 perform the same operations as those of the first embodiment, and thus the detailed description thereof will be omitted.

As a result, in the second embodiment of the present disclosure, only the fourth switch 260 and the third sensing unit 261, which are different from the foregoing first embodiment, will be described.

The fourth switch 260 is an auxiliary switch capable of opening or closing an electric energy (electric power) flow path between the grid 210 and the second load 240.

At this time, the fourth switch 260 is switched under the control of the controller 257, and maintains an on state in a normal state. Here, the normal state means a state in which the third switch 256 normally operates, namely, a state in which no failure such as an electric shortage occurs on the third switch 256 has occurred. Furthermore, the fourth switch 260 may be selectively switched to an off state in an abnormal state.

In other words, the fourth switch 260 replace the third switch 256 and performs an operation of the third switch 256 in a state in which the third switch 256 is not normally operated.

As a result, as described above, the controller 257 maintains the fourth switch 260 in an on state prior to the occurrence of the reverse power flow phenomenon.

Furthermore, when the reverse power flow phenomenon occurs, the controller 257 changes the fourth switch 260 to an off state as the third switch 256 is not normally operated to cut off electric energy discharged to the grid 210.

At this time, as electric energy discharged to the grid 210 is broken by the fourth switch 260, the controller 257 continuously make a discharge operation of the battery 252 and a power conversion operation of the inverter 254 perform.

As a result, the electric energy storage apparatus may further include a seventh operation mode of changing a switching state of the fourth switch 260, in addition to the operation mode described above.

In other words, when electric energy is discharged to the grid according to an abnormality of the operation state of the third switch 256 in the fifth operation mode, the electric energy storage apparatus can cut off the electric energy discharged by the fourth switch 260 and operate in a seventh operation mode to maintain a discharge operation of the battery 252.

The fourth switch 260 is always maintained in an on state in the foregoing first to sixth operation modes, and in the seventh operation mode, the fourth switch 260 instead performs a function of the third switch 256, thereby changing the fourth switch 260 from an on state to an off state.

As described above, according to a second embodiment of the present disclosure, the fourth switch 260 is additionally disposed between the grid 210 and the third switch 256 to control the fourth switch 260 in a situation that the third switch 256 is not normally operated so as to cut off electric energy discharged the grid 210.

On the other hand, a failure such as an electric shortage, for instance, may occur on the fourth switch 260 similarly to the third switch 256. Accordingly, when the fourth switch 260 is operated in an off state, the controller 257 receives sensing information transferred through the third sensing unit 261, and accordingly, determines whether or not electric energy is discharged to the grid 210 even when the fourth switch 260 is in an off state.

Furthermore, when electric energy discharged to the grid 210 does not exist when the fourth switch 260 is in an off state, the controller 257 maintains a discharge operation of the battery 252 and a power conversion operation of the inverter 254.

In addition, when electric energy is continuously discharged to the grid 210 in an off state of the fourth switch 260, the controller 257 determines that an abnormality has also occurred on the fourth switch 260, and stops a power conversion operation of the inverter 254 to stop a discharge operation of the battery 252.

According to the foregoing second embodiment of the present disclosure, a switch connected to the grid may be configured with a main switch and an auxiliary switch to control the auxiliary switch as the reverse power flow phenomenon occurs so as to supply normal electric power to an electric load while cutting off electric power supplied to the grid, thereby enhancing user satisfaction.

As described above, according to the present disclosure, during the discharge of the battery, it may be possible to accurately and quickly sense a reverse power flow phenomenon in which electric power due to the discharge is discharged to the grid, and stop the operation of the inverter as the reverse power flow phenomenon occurs, thereby solving a problem of causing the instability of an energy flow in a grid caused by the reverse power flow and enhancing the reliability of the electric energy storage apparatus.

In addition, according to the present disclosure, a switch connected to the grid may be configured with a main switch and an auxiliary switch to control the auxiliary switch as the reverse power flow phenomenon occurs so as to supply normal electric power to an electric load while cutting off electric power supplied to the grid, thereby enhancing user satisfaction.

What is claimed is:

1. An electric energy storage apparatus configured to receive and store at least one of first electric energy supplied from a grid or second electric energy supplied from a generator, and supply the stored electric energy or electric energy supplied from at least one of the grid and the generator to an electric load, wherein the electric load comprises a (1) first load being an ordinary load that receives electric energy supplied from the grid and consumes the received electric energy, and (2) a second load that receives energy supplied from the grid or energy supplied by the discharge of a battery and consumes the received energy, and the second load is a critical load being an electric load selectively designated by a user, and wherein the electric energy storage apparatus is configured to sense a magnitude of electric energy flowed out to the grid in an operation mode of supplying the stored electric energy to the electric load, and selectively block the output of the stored electric energy when the sensed magnitude of electric energy exceeds a preset first threshold value, the electric energy storage apparatus comprising:

a battery configured to store electric energy supplied from any one of the grid and the generator, and selectively output the stored electric energy;

a first switch disposed between a connection node connecting the grid to the generator and the battery;

a second switch disposed between the battery and the second load;

a third switch disposed between the grid and the second load that opens or closes a supply path of electric energy supplied from the grid to the second load;

a first sensing unit disposed between the grid and the third switch to sense an electric energy state at the disposed position;

a controller configured to sense whether or not electric energy flows out to the grid through the first sensing unit in a state that the third switch is off, and selectively stop a discharge operation of the battery according to the sensing result;

a fourth switch disposed between the grid and the second load and connected in series to the third switch that opens or closes an electric energy flow path between the grid and the second load; and a second sensing unit disposed between the third switch and the fourth switch, wherein the fourth switch replaces the third switch and performs an operation of the third switch in a state in which the third switch is not normally operated.

2. The electric energy storage apparatus of claim 1, wherein an operation mode of the electric energy storage apparatus comprises at least one of:

a first operation mode for charging the battery using the first electric energy, a second operation mode for charging the battery using the second electric energy, a third operation mode for supplying the first electric energy to the second load and charging the second electric energy to the battery, a fourth operation mode for supplying the first electric energy to the second load, and a fifth operation mode for supplying electric energy stored in the battery to the second load.

3. The electric energy storage apparatus of claim 2, wherein the controller is configured to sense the presence of electric energy flowed out to the grid based on a magnitude of electric energy sensed through the first sensing unit in the fifth operation mode.

4. The electric energy storage apparatus of claim 2, wherein
the controller is configured to sense the presence of electric energy flowed out to the grid based on a state of electric energy sensed through the second sensing unit.

5. The electric energy storage apparatus of claim 3, wherein when a magnitude of electric energy sensed through the second sensing unit increases to more than a preset second threshold value, the controller is configured to determine that the electric energy flows out to the grid and to stop the supply of electric energy from the battery to the second load.

6. The electric energy storage apparatus of claim 1, wherein the controller is configured to change a switching state of the auxiliary switch when a magnitude of electric energy sensed through the first sensing unit exceeds the first threshold value.

7. The electric energy storage apparatus of claim 1, wherein the auxiliary switch is configured to maintain an on-state in the first to fifth operation modes, and to be changed to an off-state as the magnitude of the electric energy exceeds the first threshold value.

8. The electric energy storage apparatus of claim 7, further comprising:
a third sensing unit disposed between the grid and the auxiliary switch,
wherein the controller is configured to stop the supply of electric energy to the second load when a magnitude of electric energy sensed through the third sensing unit exceeds the first threshold value.

* * * * *